(12) United States Patent
Akiyama

(10) Patent No.: US 7,936,998 B2
(45) Date of Patent: May 3, 2011

(54) OPTICAL TRANSMITTER APPARATUS

(75) Inventor: Yuichi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/640,862

(22) Filed: Dec. 17, 2009

(65) Prior Publication Data
US 2010/0098435 A1    Apr. 22, 2010

Related U.S. Application Data

(62) Division of application No. 11/383,768, filed on May 17, 2006, now Pat. No. 7,657,190.

(30) Foreign Application Priority Data

Jan. 31, 2006  (JP) .................................. 2006-023111

(51) Int. Cl.
    *H04B 10/04* (2006.01)
(52) U.S. Cl. ........................................ 398/195; 398/188
(58) Field of Classification Search .................. 398/188, 398/195
    See application file for complete search history.

(56) References Cited

U.S. PATENT DOCUMENTS

| 6,407,845 | B2 | 6/2002 | Nakamoto |
| 7,116,460 | B2 * | 10/2006 | Griffin ........................ 359/245 |
| 7,266,306 | B1 | 9/2007 | Harley et al. |
| 7,346,283 | B2 | 3/2008 | Kao et al. |
| 2004/0028418 | A1 | 2/2004 | Kaplan et al. |
| 2004/0081470 | A1 | 4/2004 | Griffin |
| 2006/0029319 | A1 | 2/2006 | Sugiyama |

FOREIGN PATENT DOCUMENTS

| JP | 2005-284129 | 10/2005 |
| JP | 2006-47746 | 2/2006 |

OTHER PUBLICATIONS

Restriction Requirement from U.S. Appl. No. 11/383,768, May 2009.
Notice of Allowance from U.S. Appl. No. 11/383,768, Sep. 2009.

* cited by examiner

*Primary Examiner* — Shi K Li
(74) *Attorney, Agent, or Firm* — Staas & Halsey LLP

(57) ABSTRACT

An optical DQPSK modulator comprises a pair of phase modulators. Each of the pair of the phase modulators is provided with first and second driving signals. The first and second driving signals are amplified by first and second amplifiers, respectively. An RZ intensity modulator generates an optical RZ-DQPSK signal from an optical DQPSK signal output from the optical DQPSK modulator. A photodetector generates a monitor signal from the optical RZ-DQPSK signal. A gain adjuster unit adjusts the gains of the first and second amplifiers so as to minimize the power of the monitor signal.

1 Claim, 20 Drawing Sheets

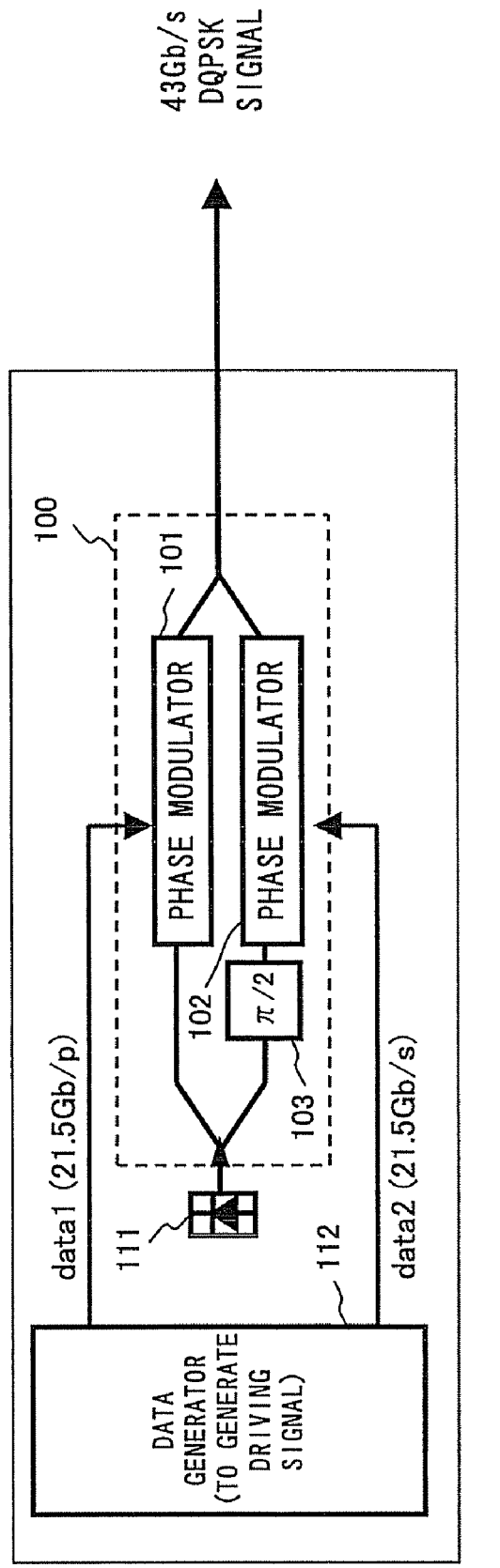
F I G. 1

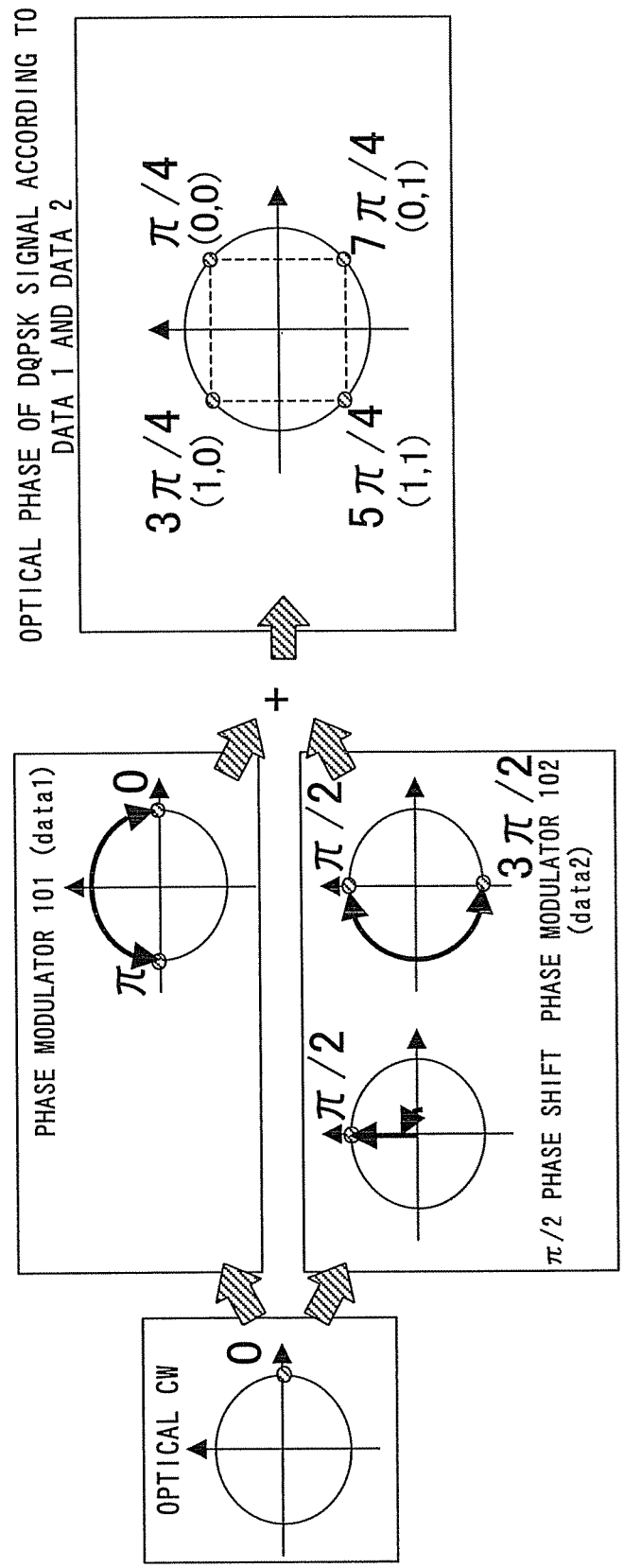
F I G. 2

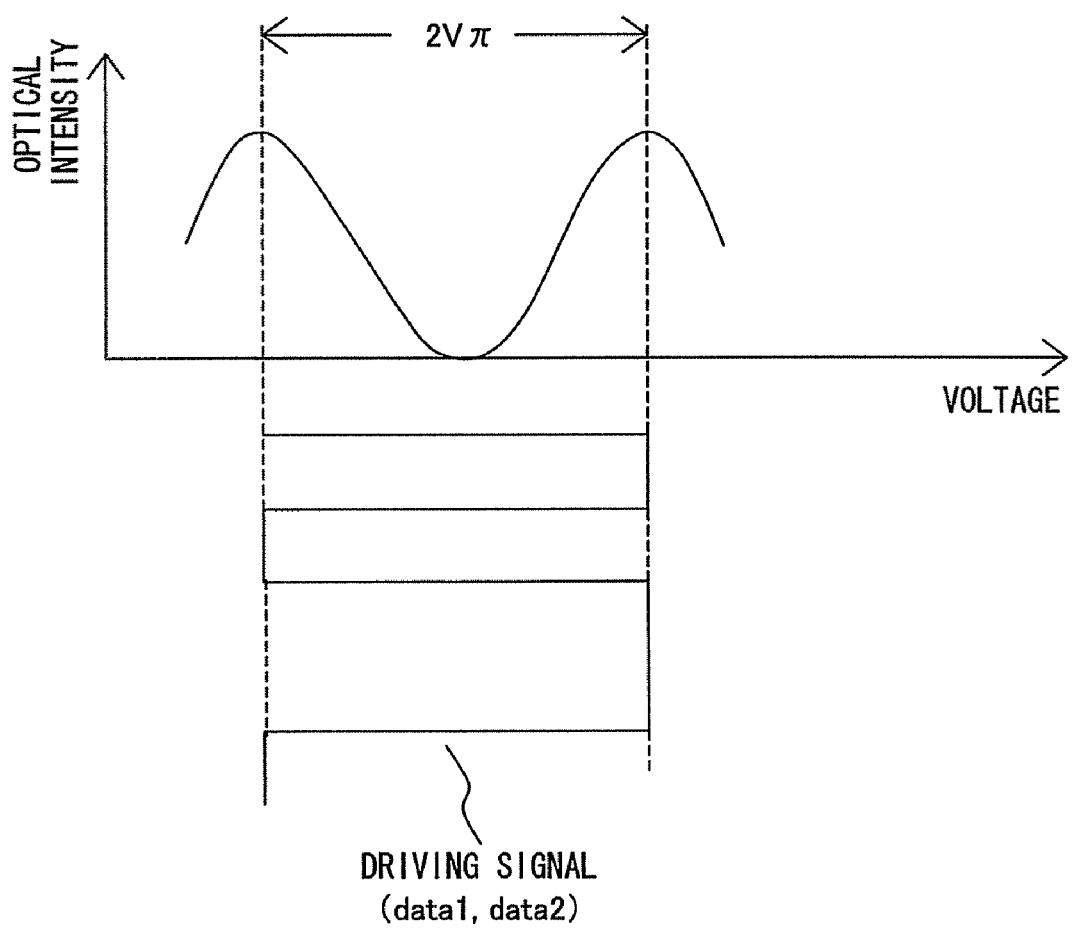
F I G. 7

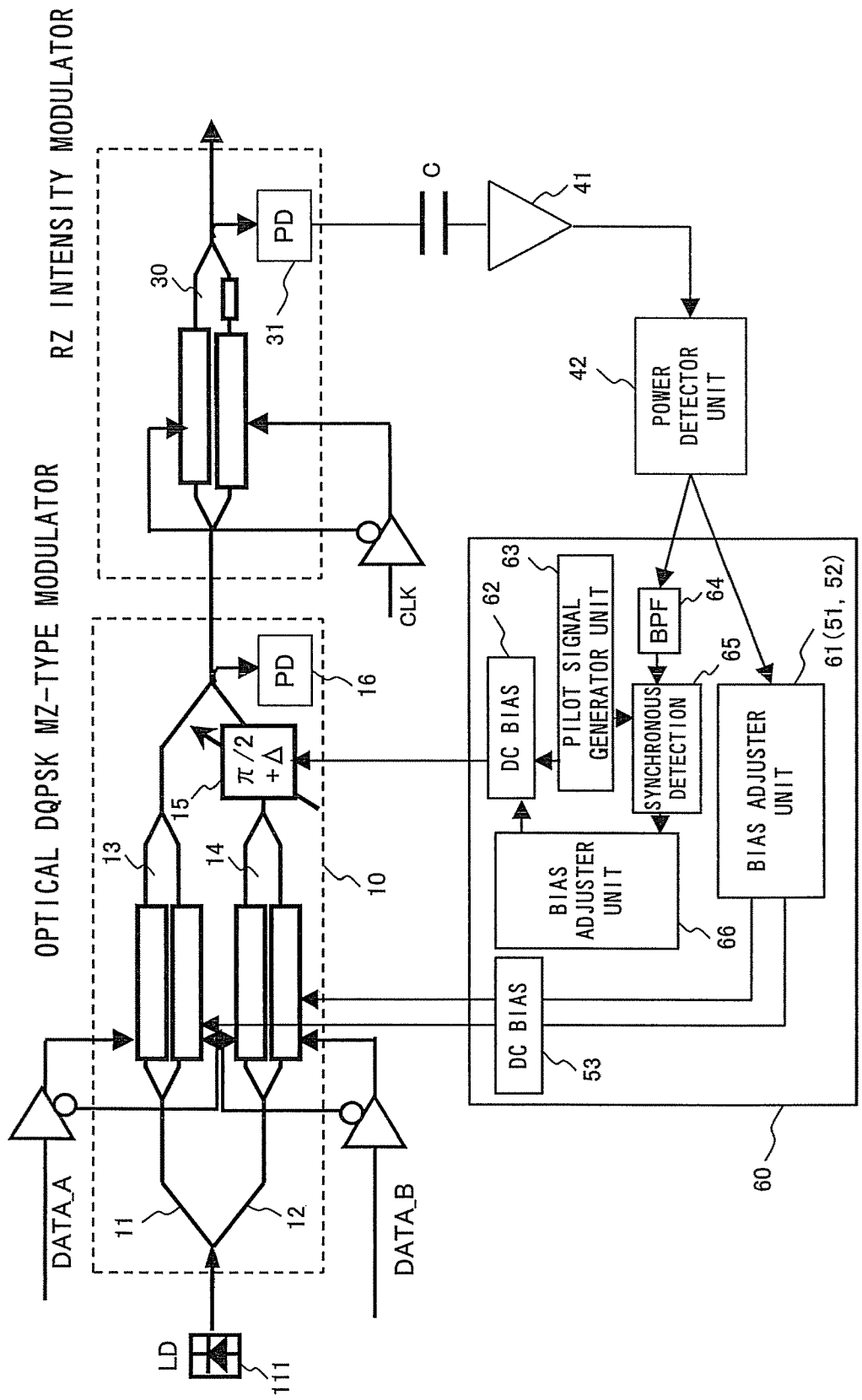
F I G. 14

OPTICAL TRANSMITTER APPARATUS

CROSS REFERENCE TO RELATED APPLICATIONS

This application is a divisional of U.S. patent application Ser. No. 11/383,768, filed May 17, 2006, now U.S. Pat. No. 7,657,190 which claims priority to Japanese Application No. 2006-023111, filed Jan. 31, 2006, the disclosures of all of which are incorporated herein by reference.

BACKGROUND OF THE INVENTION

1. Field of the Invention

The present invention relates to an optical transmitter apparatus for generating and transmitting a phase-modulated optical signal, and particularly relates to an optical transmitter apparatus for generating and transmitting an optical DQPSK signal.

2. Description of the Related Art

Phase modulation has been in practical use as one of the technologies for transmitting signals in an optical transmission system. In the phase modulation, data is transmitted by controlling the phase of a carrier wave in accordance with the transmission data. For example, in QPSK (Quadrature Phase Shift Keying) modulation, "θ", "θ+π/2", "θ+π", and "θ+3π/2" are assigned respectively to each symbol "00", "10", "11", and "01", consisting of two bit data. Here, the "θ" is an arbitrary phase. A receiver device recovers the transmission data by detecting the phase of the received signal.

DQPSK (Differential Quadrature Phase Shift Keying) is also known as a technology, which realizes the QPSK receiver apparatus, with relative ease. In the DQPSK, the difference between two successive symbols is assigned with the corresponding phase (θ, π/2, π, 3π/2). Therefore, the receiver device can recover the transmission data by detecting the phase difference between the two successive symbols.

FIG. 1 is a diagram describing the configuration of a DQPSK transmitter apparatus. In this drawing, only necessary configuration is shown in order to explain the operation principle.

An optical DQPSK modulator 100 is a Mach-Zehnder modulator, and is provided with optical continuous wave (CW) generated by an optical source 111. The optical CW is split by an optical splitter, and is guided to a first arm and a second arm. In the first arm, a phase modulator 101 is provided, and in the second arm, a phase modulator 102 and a phase shifter 103 are provided. The phase modulators 101 and 102 are driven by driving signals data 1 and data 2, respectively. Here, the driving signals data 1 and data 2 are generated by a data generator unit 112 comprising a DQPSK precoder. The phase shifter 103 provides phase difference π/2 between the first and the second arms. A DQPSK signal is generated by combining a pair of optical signals output from the phase modulators 101 and 102.

FIG. 2 is a diagram explaining the operation of the DQPSK transmitter apparatus. Here, assume that the phase of the optical continuous wave is zero.

The phase of the optical signal output from the phase modulator 101 becomes "0" or "π" in accordance with the driving signal data 1. On the other hand, the second arm comprises a phase shifter 103 providing the phase difference of π/2. Therefore, the phase of the optical signal output from the phase modulator 102 is "π/2" or "3π/2" in accordance with the driving signal data 2. Then, "π/4", "3π/4", "5π/4", or "7π/4" is assigned to each symbol with two bit information (00, 10, 11, 01). The receiver device recovers the transmission data by detecting the phase difference between successive two symbols.

Detailed description of the configuration and the operation of the optical DQPSK transmitter apparatus is provided in, for example, a Patent Document 1 (US2004/0081470 or WO2002/051041). In addition, a Patent Document 2 (US2004/0028418) describes a configuration performing feedback control of the DC bias of a Mach-Zehnder modulator.

In order to improve the quality of communications, which employ the DQPSK (especially, high speed data communication with several ten Gb/s), the phase of the optical signal output from the optical DQPSK transmitter apparatus has to be accurately controlled. However, the DQPSK is a technology under development, and still has a number of problems to be solved or improved.

If the amplitude of the driving signals data 1 and data 2 is not appropriately adjusted, for example, the phase of the DQPSK signal deviates from a desired phase. In an example shown in FIG. 3, the amplitude of the driving signal data 1 is smaller than a prescribed amplitude. In such a case, the intensity of the generated DQPSK signal also deviates. Note that the amplitude of the driving signal may deviate due to the aging degradation in the electrical drive system, variations in characteristics of electronic components or optical components, or thermal change.

If the DC bias of the phase modulators 101 and 102 or the amount of phase shift of the phase shifter 103 is not appropriate, the phase of the DQPSK signal deviates from the desired phase.

These problems can occur in the QPSK as well as in the DQPSK.

SUMMARY OF THE INVENTION

It is an object of the present invention to provide an optical transmitter apparatus for improving the quality of the communications, which employ the DQPSK or QPSK.

The optical transmitter apparatus of the present invention comprises a phase modulator, having a first phase modulation element for generating a first modulation signal on a first arm in accordance with a first driving signal, a second phase modulation element for generating a second modulation signal on a second arm in accordance with a second driving signal, and a phase shift element for providing a phase difference between the first arm and the second arm, which generates a phase-modulated signal by combining the first and second modulation signals, an intensity modulator for performing intensity modulation on the phase-modulated signal output from the phase modulator, a detection unit for detecting the power of an AC component of an optical signal output from the intensity modulator, and an adjuster unit for adjusting an amplitude of at least one of the first driving signal or the second driving signal so as to minimize the power detected by the detection unit.

The phase (and intensity) of the first and second modulation signals depends on the amplitude of the first and second driving signals provided to the first and second phase modulation elements. The power of the AC component of the optical signal output from the intensity modulator becomes minimum when the amplitude of the first and second driving signals are optimized. Therefore, a phase-modulated signal with an appropriate phase corresponding to the first and second driving signals can be generated by adjusting the amplitude of the first driving signal and/or the second driving signal so as to minimize the power value.

Another aspect of the optical transmitter apparatus of the present invention comprises a phase modulator, having a first phase modulation element for generating a first modulation signal on a first arm in accordance with a first driving signal, a second phase modulation element for generating a second modulation signal on a second arm in accordance with a second driving signal, and a phase shift element for providing a phase difference between the first arm and the second arm, which generates a phase-modulated signal by combining the first and second modulation signals, a DC bias generator unit for generating first DC bias and second DC bias for adjusting an operation point of the first and second phase modulation elements, an intensity modulator for performing intensity modulation on the phase-modulated signal output from the phase modulator, a detection unit for detecting the power of an AC component of an optical signal output from the intensity modulator, and an adjuster unit for adjusting an amount of phase shift of the phase shift element as well as adjusting at least one of the first bias or the second bias based on the power detected by the detection unit.

The phase (and intensity) of the first and second modulation signals depends on the first and second DC bias provided to the first and second phase modulation elements. The power of the AC component of the optical signal output from the intensity modulator becomes minimum when the first bias and the second bias are optimized. Therefore, a phase-modulated signal with an appropriate phase corresponding to the first and second driving signals can be generated by adjusting the first bias and/or the second bias so as to minimize the power value. The detection unit to detect the power of an AC component of an optical signal output from the intensity modulator is shared for the adjustment of the DC bias and the adjustment of the phase shift amount of the phase shift element. Therefore, the size of the optical transmitter apparatus can be reduced.

According to the present invention, it is possible to improve the quality of communications, which employ the DQPSK or QPSK.

BRIEF DESCRIPTION OF THE DRAWINGS

FIG. 1 is a diagram describing the configuration of a DQPSK transmitter apparatus;

FIG. 2 is a diagram explaining the operation of the DQPSK transmitter apparatus;

FIG. 7 is a diagram explaining the amplitude of the driving signal:

FIG. 14 is a diagram describing the configuration of the optical DQPSK transmitter apparatus of the third embodiment;

DESCRIPTION OF THE PREFERRED EMBODIMENTS

Details of the embodiments of the present invention are set forth with reference to the drawings. In the following description, a configuration for generating and transmitting an optical DQPSK signal is explained; however, the present invention is applicable to an optical transmitter apparatus for generating and outputting an optical QPSK signal.

Figure 4:
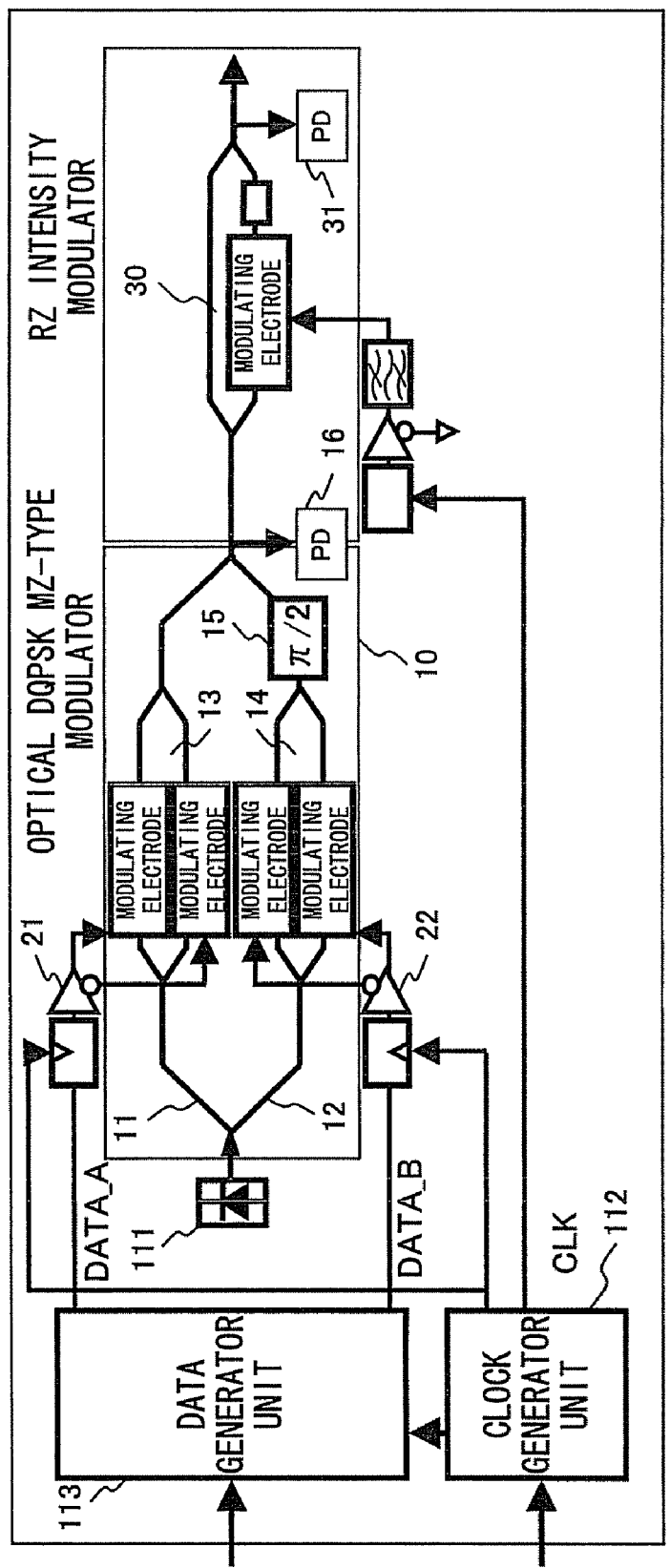
FIG. 4 is a diagram describing a fundamental configuration of an optical DQPSK transmitter apparatus relating to the embodiment of the present invention.

FIG. 4 is a diagram describing a fundamental configuration of an optical DQPSK transmitter apparatus relating to the embodiment of the present invention. Note that the optical DQPSK transmitter apparatus of the embodiment has a configuration in which RZ intensity modulation is applied to the generated optical DQPSK signal.

An optical DQPSK modulator 10 is a Mach-Zehnder modulator, for example, and an optical continuous wave (CW) generated by an optical source 111 is provided. The optical CW is split by an optical splitter, and guided to a pair of arms 11 and 12. Each of the arms 11 and 12 are an optical waveguide, which propagates an optical signal.

The arms 11 and 12 comprise phase modulators 13 and 14, respectively. The phase modulators 13 and 14 are Mach-Zehnder modulators, for example. Each of the phase modulators 13 and 14 comprises a modulating electrode. Each modulating electrode is provided with a corresponding driving signal. The optical path length of the waveguide of the phase modulators 13 and 14 changes in accordance with the voltage of the driving signal. Therefore, each of the phase modulators 13 and 14 generates an optical signal with an optical phase corresponding to the voltage of the provided driving signal. In addition, a phase shifter 15 provides a phase difference $\pi/2$ ($\pi/2 + 2n\pi$ (n is an integer)) between the arms 11 and 12.

The phase modulators 13 and 14 are provided with DC bias in order to adjust their operating points. The DC bias can be provided to the above modulating electrode or can be provided via a DC bias electrode comprised separately from the modulating electrode.

A clock generator unit 112 generates a clock signal. A data generator unit 113 generates a pair of driving signals, data 1 and data 2, by using the clock signal generated by the clock generator unit 112. The driving signals data 1 and data 2 are obtained by encoding transmission data employing a DQPSK pre-coder. The driving signals data 1 and data 2 are provided to the modulating electrodes of the phase modulators 13 and 14, after being amplified by amplifiers 21 and 22, respectively. The driving signals data 1 and data 2 are provided to the modulating electrodes of the phase modulators 13 and 14, respectively, as differential signals. The amplitude of each differential signal corresponds to "2Vπ" of the operating characteristics of the phase modulators 13 and 14. The synchronization between the driving signals data 1 and data 2 is established by using the clock signal generated by the clock generator unit 112.

An RZ intensity modulator 30 performs RZ intensity modulation to the optical DQPSK signal generated by the optical DQPSK modulator 10. The RZ intensity modulator 30 is, for example, a Mach-Zehnder modulator comprising modulating electrodes. The modulating electrodes are provided with the clock signal generated by the clock generator unit 112 as an intensity modulating signal. Note that the amplitude of the intensity modulating signal provided to the RZ intensity modulator 30 corresponds to "Vπ" of the operating characteristics of the RZ intensity modulator 30.

A photodetector 16 converts the optical DQPSK signal generated by the optical DQPSK modulator 10 into an electrical signal. A photodetector 31 converts the optical RZ-DQPSK signal generated by the RZ intensity modulator 30 into an electrical signal. In this embodiment, each of the photodetectors 16 and 31 is a photodiode, for example. The signal obtained by the photodetectors 16 and 31 is used as a feedback signal for controlling the operation of the optical DQPSK transmitter apparatus.

In the optical DQPSK transmitter apparatus with the above configuration, the operation of the optical DQPSK modulator 10 is the same as explained with reference to FIG. 2. In other words, the phase (π/4, 3π/4, 5π/4, or 7π/4) of the optical DQPSK signal generated by the optical DQPSK modulator 10 is determined in accordance with a pair of the driving signals data 1 and data 2 (00, 10, 11, or 01) corresponding to each symbol. The speed of the data transmitted by the optical DQPSK signal is not limited in particular; however, it is several ten Gb/s.

The RZ intensity modulator 30 generates the optical RZ-DQPSK signal by RZ intensity modulation on the optical DQPSK signal. The optical RZ-DQPSK signal is obtained by reducing the optical power of the DQPSK signal in a period equivalent to a symbol rate of the transmission signal. In other words, the optical power of the RZ-DQPSK signal fluctuates at a frequency, which is the same as the symbol rate of the transmission signal. It should be noted that the phase of a signal carrier wave does not change in association with the RZ modulation. In other words, the phase of each symbol of the RZ-DQPSK signal is "π/4", "3π/4", "5π/4", or "7π/4".

First Embodiment

Figure 5:
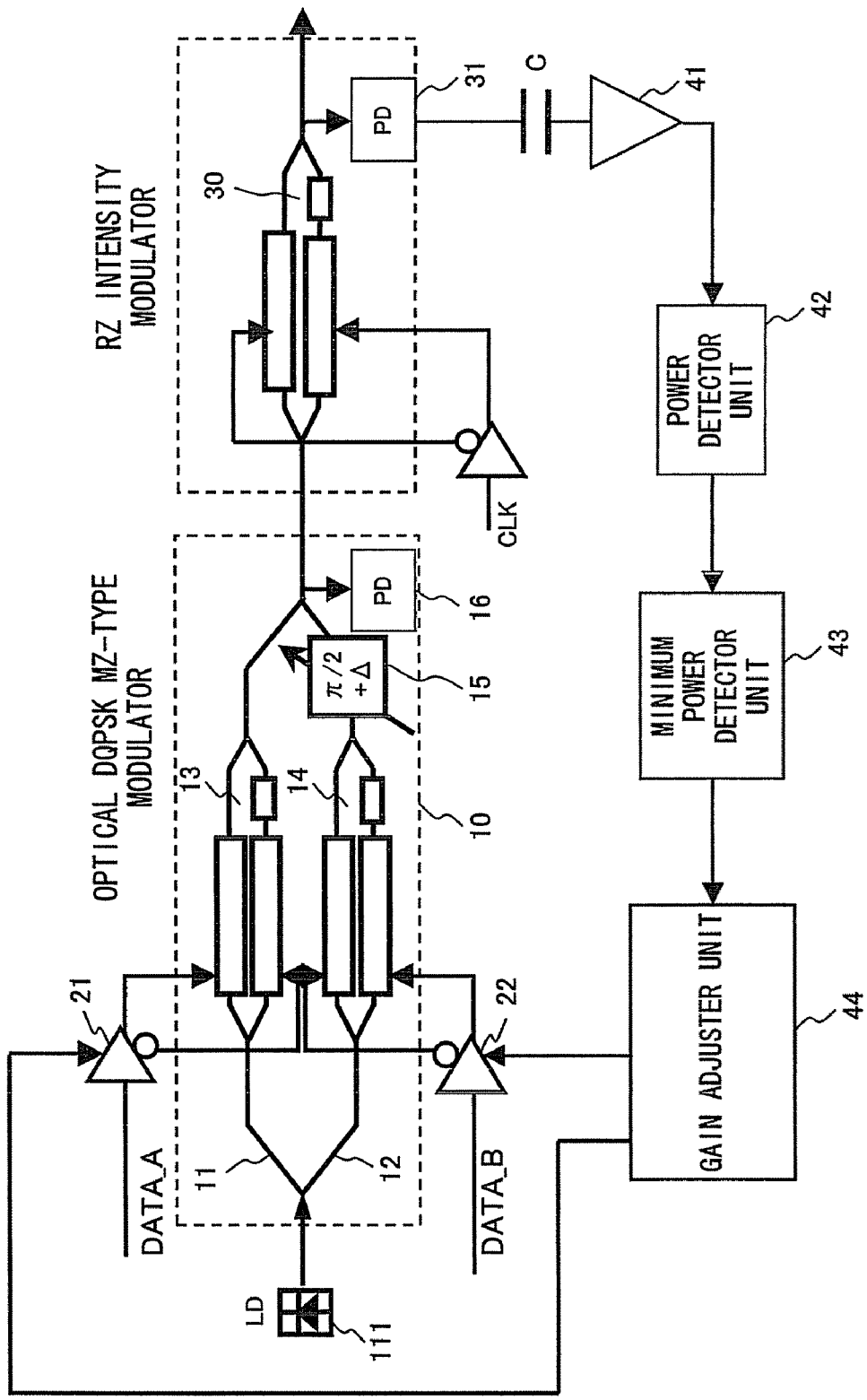
FIG. 5 is a diagram describing the configuration of an optical DQPSK transmitter apparatus of the first embodiment.

FIG. 5 is a diagram describing the configuration of an optical DQPSK transmitter apparatus of the first embodiment. The optical DQPSK transmitter apparatus of the first embodiment provides a function for adjusting the amplitude of a driving signal based on the power of the optical RZ-DQPSK signal generated by the RZ intensity modulator 30. In FIG. 5, descriptions of the clock generator unit 112 and the data generator unit 113 are omitted.

The photodetector 31 converts the optical RZ-DQPSK signal output from the RZ intensity modulator 30 into an electrical signal (hereinafter referred to as a "monitor signal"). A capacitor C removes a DC component from the monitor signal obtained by the photodetector 31. By so doing, an AC component of the optical RZ-DQPSK signal is extracted. An amplifier 41 amplifies the monitor signal from which the DC component is removed. A power detector unit 42 detects power of the monitor signal amplified by the amplifier 41. The power of the monitor signal is detected by averaging (i.e. integration) the voltage of the monitor signal.

As described above, the monitor unit, comprising the photodetector 31, the capacitor C, the amplifier 41, and the power detector unit 42, detects the power of the monitor signal corresponding to the optical RZ-DQPSK signal. In this embodiment, the bandwidth of the monitor unit (the upper limit operating speed) is not limited in particular; however it can be several ten MHz to several GHz, for example.

A minimum power detector unit 43 and a gain adjuster unit 44 adjust the gains of the amplifiers 21 and 22 so that the power of the monitor signal detected by the power detector unit 42 is to be minimum. The minimum power detector unit 43 and the gain adjuster unit 44 can be implemented by a CPU executing a prepared program, for example.

Figures 6A, 6B:
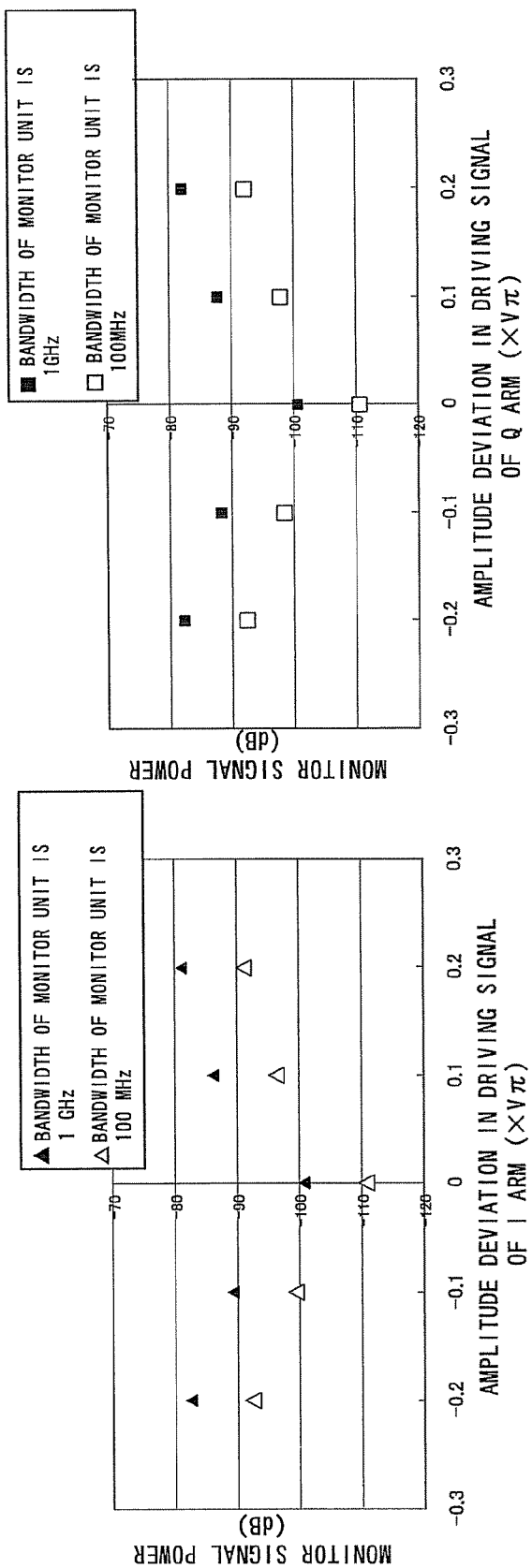
FIG. 6A and FIG. 6B show a simulation result on the relation between the deviation of the amplitude and the power of the monitor signal.

FIG. 6A and FIG. 6B show a simulation result on the relation between the deviation of the amplitude of the driving signal and the power of the monitor signal. Here, FIG. 6A shows the relation between the deviation of the amplitude of the driving signal data 1 provided to the phase modulator 13 of the arm 11 (I arm) and the power of the monitor signal under an assumption that the amplitude of the driving signal data 2 provided to the phase modulator 14 of the arm 12 (Q arm) is appropriately adjusted. Similarly, FIG. 6B shows the relation between the deviation of the amplitude of the driving signal data 2 provided to the phase modulator 14 of the Q arm and the power of the monitor signal under an assumption that the amplitude of the driving signal data 1 provided to the phase modulator 13 of the I arm is appropriately adjusted.

The appropriate amplitude of the driving signals data 1 and data 2 is, basically, equivalent to 2Vπ of the operation characteristics of the phase modulators 13 and 14, as shown in FIG. 7. When each of the amplitude of the driving signals data 1 and data 2 is optimized, the phase of the optical DQPSK signal is accurately assigned, and communication quality is improved. Therefore, in this simulation, the calculation is performed on the basis of the amplitude of the driving signals data 1 and data 2 being 2Vπ. Note that if the amplitude of the driving signals deviates from 2π, the optical intensity of the corresponding phase modulator is changed. For that reason, when the amplitude of the driving signal deviates from an optimal value (or when the amplitude of a pair of driving signals becomes imbalanced), the phase (and intensity) of the optical DQPSK signal is in an inappropriate state, causing the deterioration of the communication quality, as explained with reference to FIG. 3.

As shown in FIG. 6A and FIG. 6B, the characteristic of the I arm and the Q arm are mostly the same. The above simulation result indicates that in either the I arm and the Q arm, the power of the monitor signal is minimized when the amplitude of the driving signals data 1 and data 2 are appropriately adjusted. Therefore, by adjusting the amplitude of the driving signals data 1 and data 2 so that the power of the monitor signal is minimized, the communication quality can be improved.

It should be noted that, as shown in FIG. 6A and FIG. 6B, when the bandwidth of the monitor unit (the photodetector 31, the capacitor C, the amplifier 41, and the power detector 42) is low, the power of the monitor signal detected by the power detector 42 becomes small. However, even if the bandwidth of the monitor unit is lowered, the amount of change in the power of the monitor signal with respect to the deviation of the amplitude of the driving signals is approximately the same. For example, in either case of the bandwidth of the monitor unit being 1 GHz or being 100 MHz, if the amplitude of the driving signal deviates by $0.1 \times V\pi$, the power of the monitor signal changes by approximately 12 dB. Thus, even if the bandwidth of the monitor unit is lowered, it is possible to optimize the amplitude of the driving signals data 1 and data 2 based on the power of the monitor signal.

Figure 3:
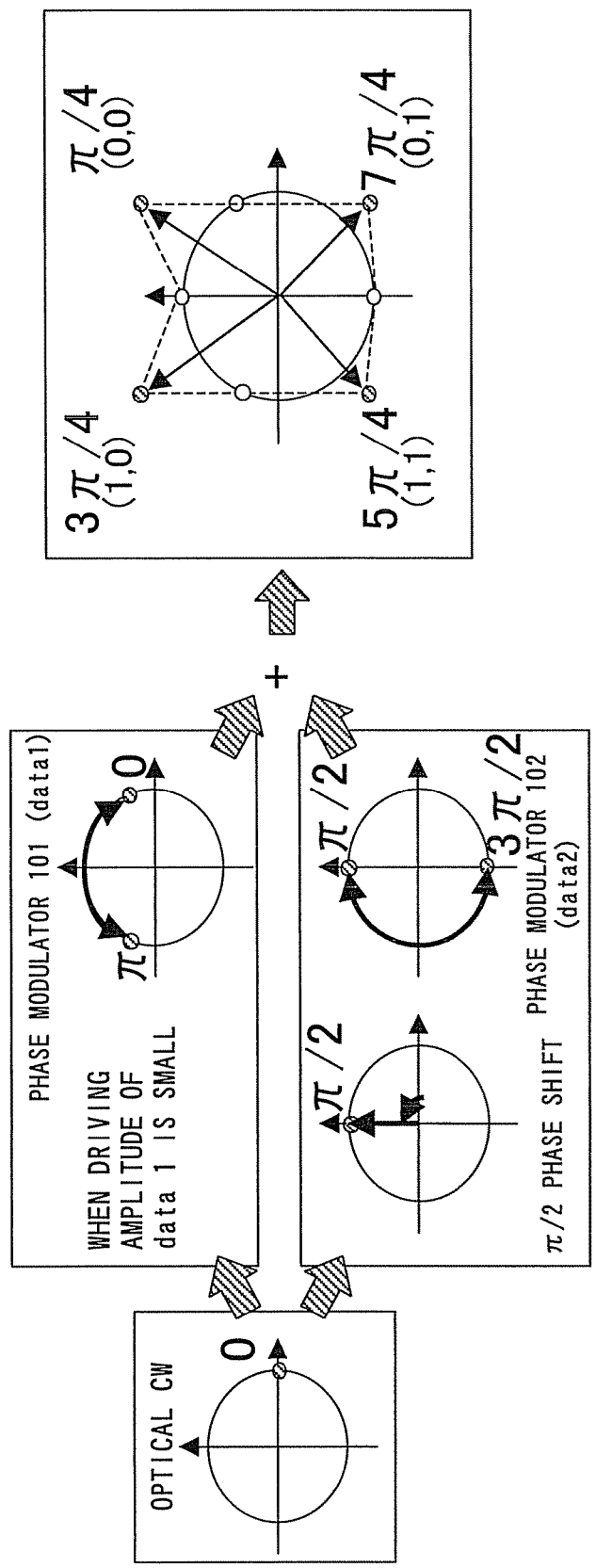
FIG. 3 is a diagram explaining a problem of the conventional DQPSK.

The reason why the power of the monitor signal is changed in accordance with the amplitude of the driving signal is considered to be caused by the change in the distance between the origin and the signal point of the optical DQPSK signal on the phase plane and change in optical power of the optical DQPSK signal, as explained with reference to FIG. 3.

The above simulation is performed under an assumption that the amount of phase shift of the phase shifter 15 is accurately adjusted to $\pi/2$. If the amount of phase shift of the phase shifter 15 deviates from $\pi/2$ in the simulation, the amount of change in the power of the monitor signal with respect to the deviation of the amplitude becomes small; however, the similar characteristics can be obtained. In other words, even when the amount of phase shift of the phase shifter 15 is not accurately adjusted to $\pi/2$, the amplitude of the driving signal can be optimized by adjusting the gains of the amplifiers 21 and 22 so as to minimize the power of the monitor signal. Therefore, it is possible to optimize the amplitude of the driving signal before adjusting the amount of phase shift of the phase shifter 15, and it is also possible to accurately adjust the amount of phase shift of the phase shifter 15.

Figure 8:
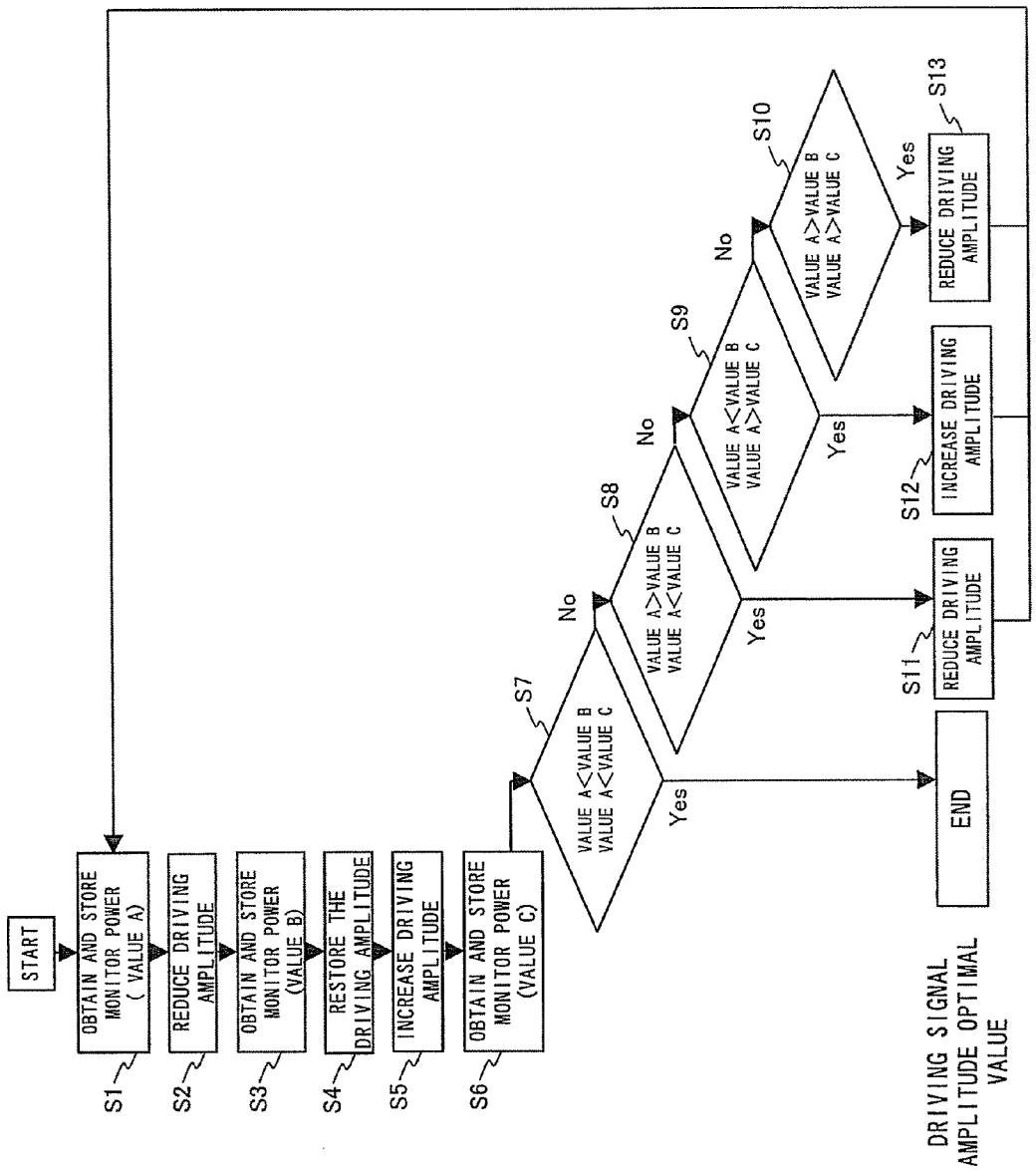
FIG. 8 is a flowchart showing a process to adjust the amplitude of the driving signal.

FIG. 8 is a flowchart showing a process to adjust the amplitude of the driving signal. The process is executed for each of the I arm and the Q arm.

In steps S1 through S6, the power value of the monitor signal is obtained while changing the gain of the amplifier 21 (or 22). Specifically, the power value A obtained with the current gain, the power value B obtained with the gain smaller than the current gain by a prescribed value, and the power value C obtained with the gain larger than the current gain by a prescribed value are obtained and stored.

In steps S7 through S10, the power values A, B, and C are compared with one another. When "A<B" and "A<C" (step S7: Yes), it is determined that the power of the monitor signal obtained with the current gain is the minimum value, and the process is terminated. When "A>B" and "A<C" (step S8: Yes), the gain of the amplifier 21 is reduced by a prescribed value in step S11, and the process returns to step S1. When "A<B" and "A>C" (step S9: Yes), the gain of the amplifier 21 is increased by a prescribed value in step S12, and the process returns to step S1. In the case of the "A>B" and "A>C", it is considered as an error state, however the gain of the amplifier 21 is reduced by a prescribed value in step S13, and the process returns to step S1.

The above process is executed alternately in the I arm and the Q arm and is repeated, for example. By so doing, the amplitude of the driving signal is optimized in both of the I arm and the Q arm.

The above process should be executed in both of the I arm and the Q arm preferably; however, execution of the above process in either one of the I arm or the Q arm can still improve the communication quality.

Second Embodiment

Figure 9:
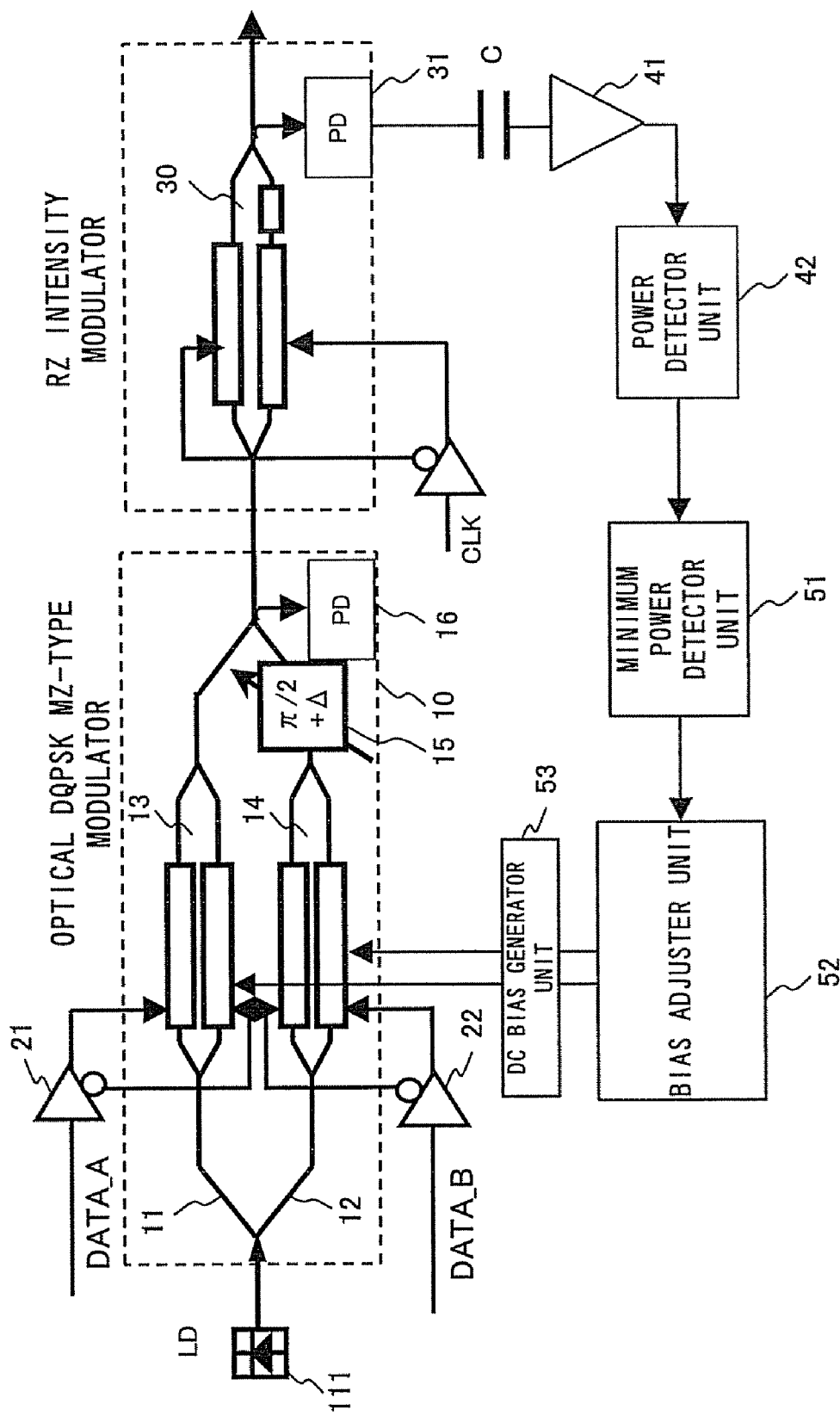
FIG. 9 is a diagram describing the configuration of the optical DQPSK transmitter apparatus of the second embodiment.

FIG. 9 is a diagram describing the configuration of the optical DQPSK transmitter apparatus of the second embodiment. The optical DQPSK transmitter apparatus of the second embodiment provides a function for adjusting the DC bias of each of the phase modulators 13 and 14 in the optical DQPSK modulator 10, based on the power of the optical RZ-DQPSK signal generated by the RZ intensity modulator 30. Note that the descriptions of the clock generator unit 112 and the data generator unit 113 are omitted.

In FIG. 9, the monitor unit (i.e. the photodetector 31, the capacitor C, the amplifier 41 and the power detector 42) is basically the same as that of the first embodiment. In other words, the monitor unit detects the power of the optical RZ-DQPSK signal and generates a monitor signal.

A minimum power detector unit 51 and a bias adjuster unit 52 adjust the DC bias for adjusting the operation point of the phase modulators 13 and 14 so that the power of the monitor signal detected by the power detector unit 42 becomes minimum. Here, the minimum power detector unit 51 and the bias adjuster unit 52 are realized by the CPU executing a prepared program, for example. A DC bias generator unit 53 generates the DC bias in accordance with the instruction from the bias adjuster unit 52 and provides the DC bias to the phase modulators 13 and 14.

Figures 10A, 10B:
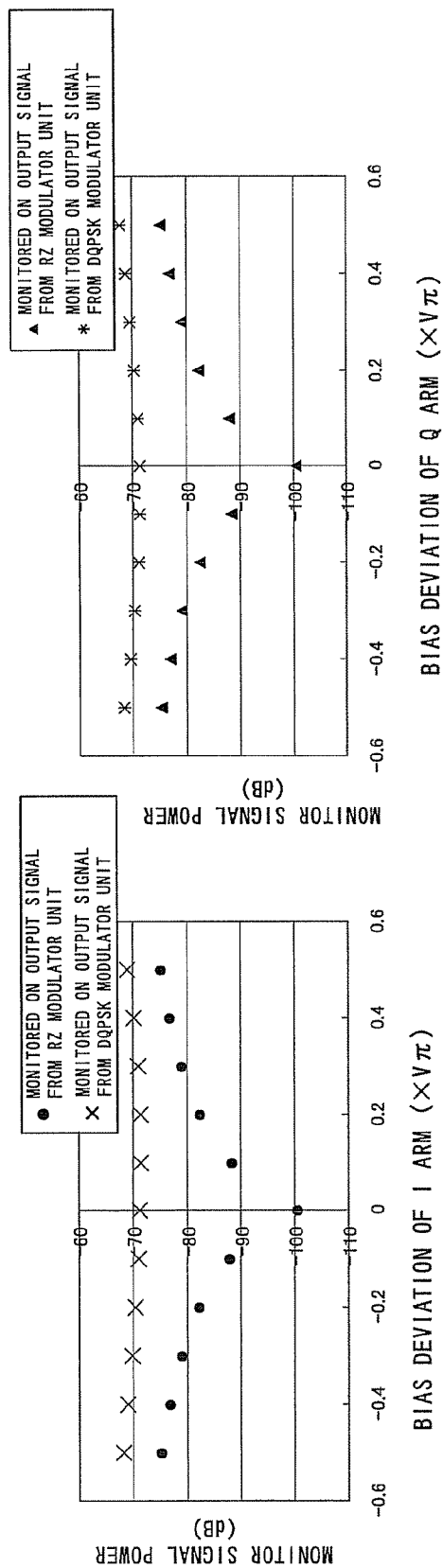
FIG. 10A and FIG. 10B show a simulation result on the relation between the deviation of the DC bias and the power of the monitor signal in the configuration shown in FIG. 9.

FIG. 10A and FIG. 10B show a simulation result on the relation between the deviation of the DC bias and the power of the monitor signal. FIG. 10A shows the relation between the deviation of the DC bias provided to the phase modulator 13 of the arm 11 (I arm) and the power of the monitor signal under an assumption that the DC bias provided to the phase modulator 14 of the arm 12 (Q arm) is appropriately adjusted. Similarly, FIG. 10B shows the relation between the deviation of the DC bias provided to the phase modulator 14 of the Q arm and the power of the monitor signal under an assumption that the DC bias provided to the phase modulator 13 of the I arm is appropriately adjusted.

Figure 11:
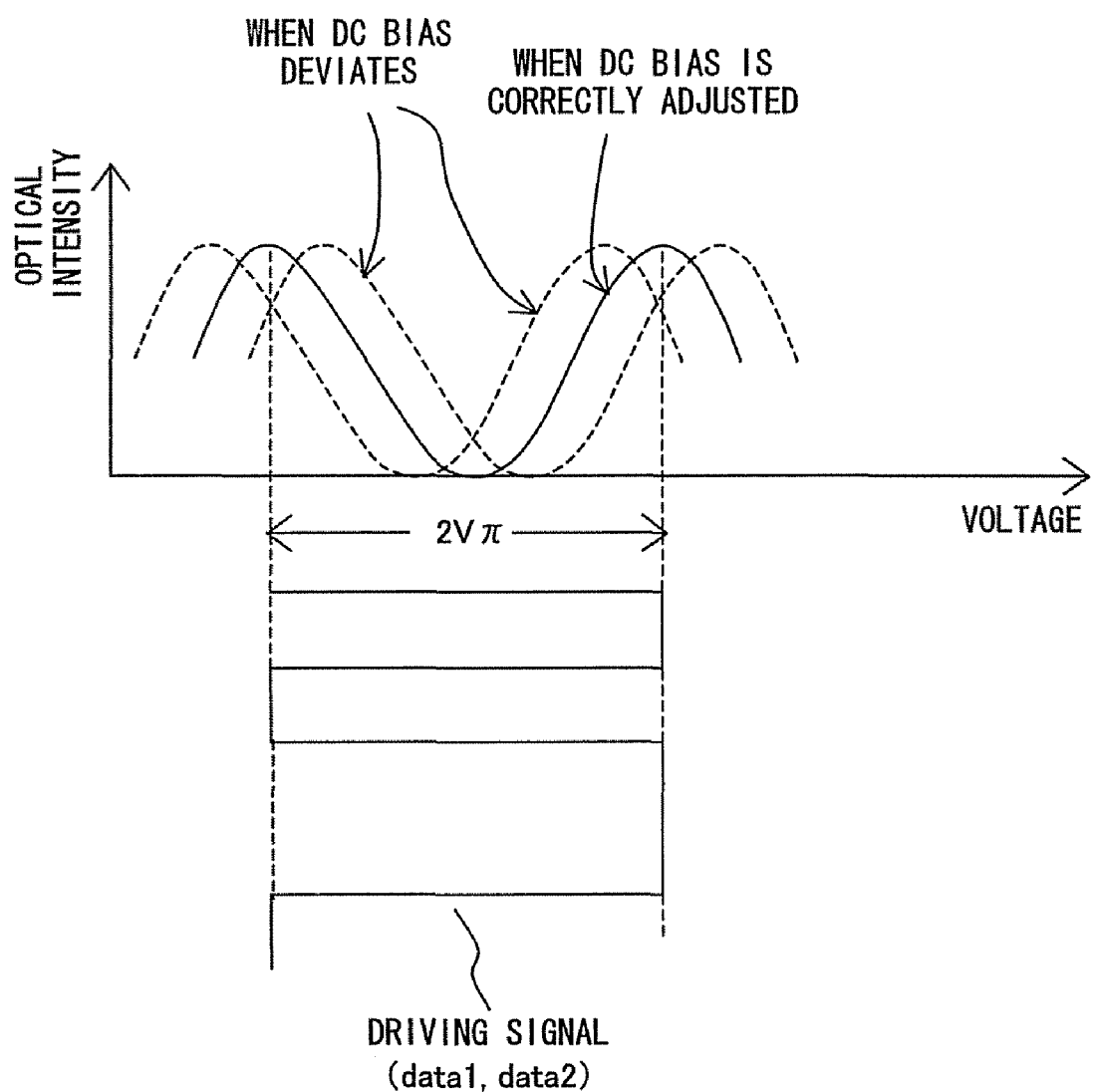
FIG. 11 is a diagram explaining the DC bias of the phase modulator.

A proper value of the DC bias is as shown in FIG. 11, and it is a value at which a state that the driving signal dithers about the point where the optical output intensity of the phase modulator is local minimum is obtained. The simulation shown in FIG. 10A and FIG. 10B calculates the case when the DC bias of the phase modulator deviates from the proper value. When the DC bias deviates from the proper value, the intensity of the output optical signal from corresponding phase modulator is changed. Therefore, when the DC bias of each phase modulator deviates from the proper value (or the DC bias of a pair of the phase modulators becomes imbalanced), the phase (and intensity) of the optical DQPSK signal is in an inappropriate state, causing the deterioration of the communication quality. Note that the operation point of the phase modulator may fluctuate due to the DC drift or thermal change etc.

As shown in FIG. 10A and FIG. 10B, the characteristics of the I arm and the Q arm are mostly the same. The above simulation result indicates that in either the I arm and the Q arm, the power of the monitor signal is minimized when the DC bias of the phase modulators 13 and 14 are appropriately adjusted. Therefore, by adjusting the DC bias so that the power of the monitor signal is minimized, the communication quality can be improved. Here, the procedure of the process minimizing the power of the monitor signal is basically based on the flowchart of FIG. 8.

It should be noted that in the example shown in FIG. 9, the monitor signal is generated by using the optical RZ-DQPSK signal output from the RZ intensity modulator 30. The monitor signal, also, may be generated by using the optical DQPSK signal output from the optical DQPSK modulator 10. In such a case, the monitor signal obtained from the photodetector 16 is transmitted to the power detector 42 via the capacitor C and the amplifier 41. However, as shown in FIG. 10A and FIG. 10B, the change in the power of the monitor signal obtained by using the optical DQPSK signal is smaller than the change in the power of the monitor signal obtained by using the optical RZ-DQPSK signal. Therefore, in terms of the DC bias adjustment, the configuration in which the monitor signal is generated by using the optical RZ-DQPSK signal has advantage over the configuration using the optical DQPSK signal. Additionally, in a case that the optical DQPSK modulator 10 and the RZ intensity modulator 30 are formed on one substrate, the configuration in which the optical output of the RZ intensity modulator 30 is monitored has advantage for miniaturization.

Figure 12:
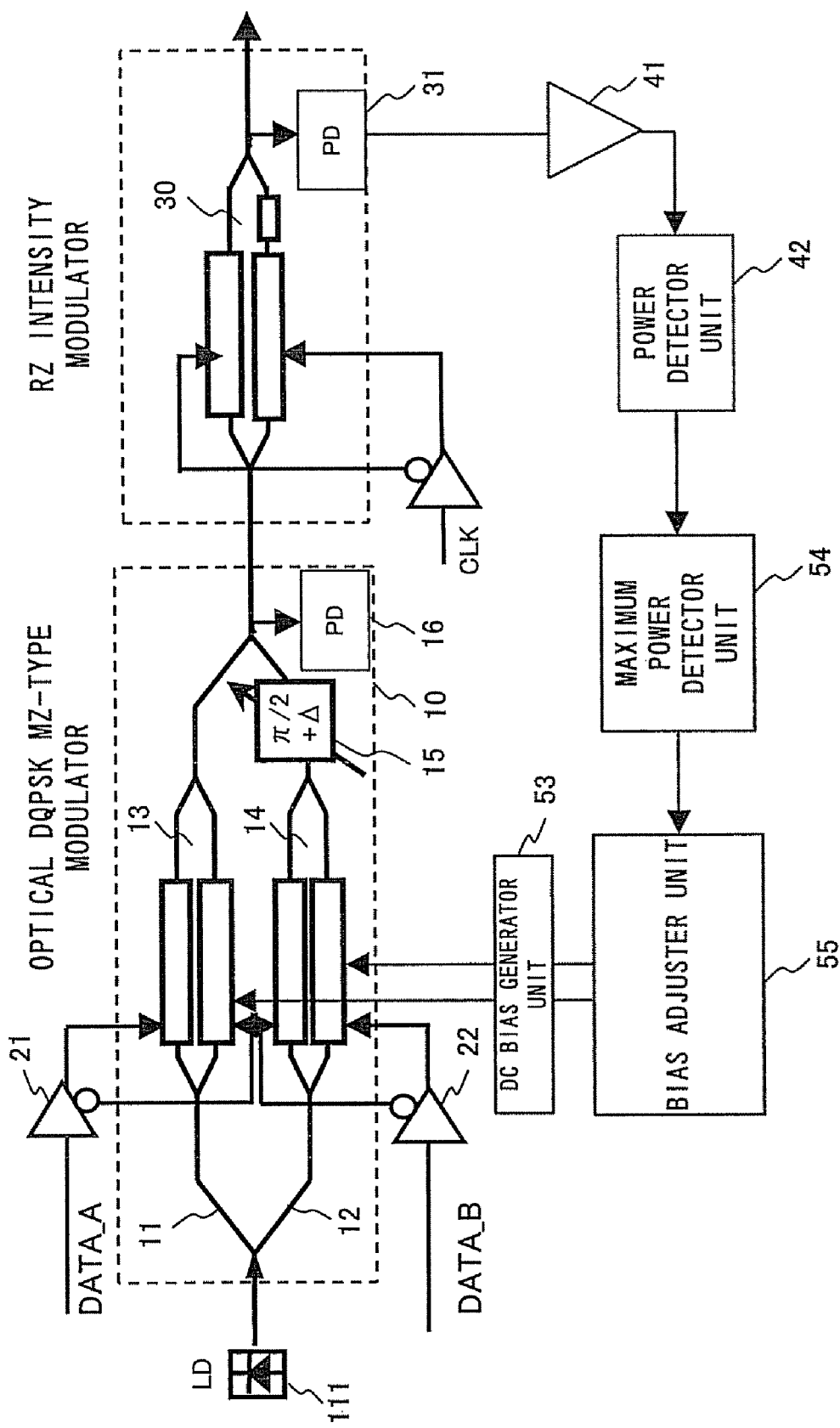
FIG. 12 is a diagram describing a modification example of the second embodiment.

FIG. 12 is a diagram describing a modification example of the second embodiment. The optical DQPSK transmitter apparatus shown in FIG. 9 comprises the capacitor C for removing DC component of the monitor signal obtained by the photodetector 31, and controls the DC bias of the phase modulators 13 and 14 by using the AC component of the optical RZ-DQPSK signal. On the other hand, the optical DQPSK transmitter shown in FIG. 12 does not comprise the capacitor C for removing the DC component of the monitor signal. In other words, the monitor signal containing the DC component is transmitted to the power detector unit 42.

A maximum power detector unit 54 and a bias adjuster unit 55 adjust the DC bias for adjusting the operation point of the phase modulators 13 and 14 so that the power of the monitor signal detected by the power detector unit 42 becomes maximum. The DC bias generator unit 53 generates DC bias in accordance with the instruction from the bias adjuster unit 55 and provides the DC bias to the phase modulators 13 and 14.

Figures 13A, 13B:
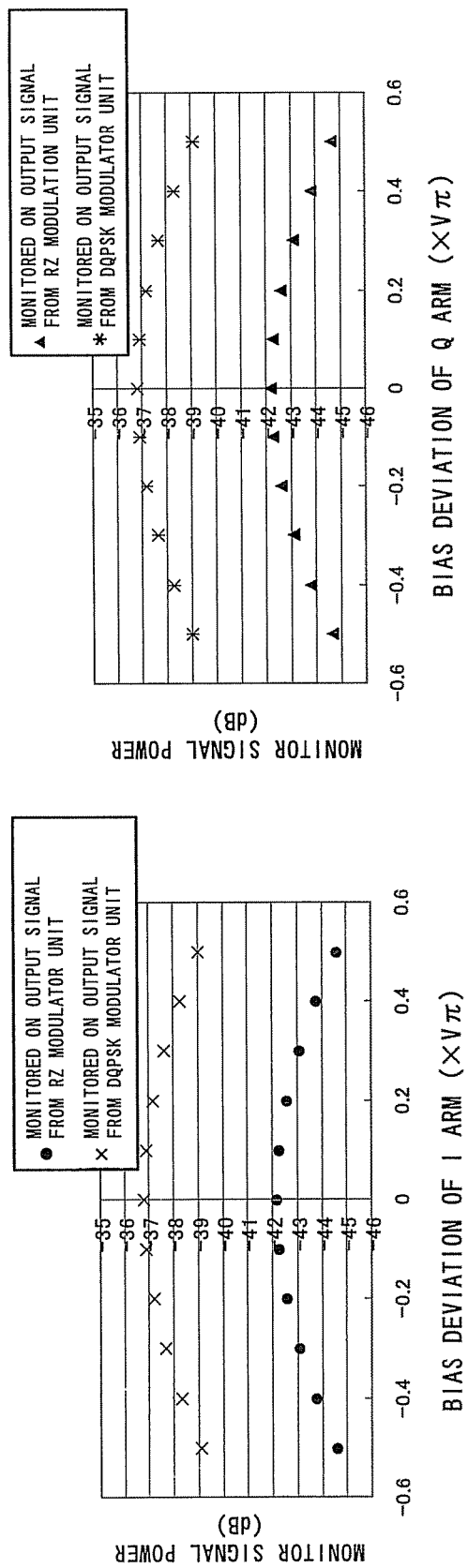
FIG. 13A and FIG. 13B show a simulation result on the relation between the deviation of the DC bias and the power of the monitor signal in the configuration shown in FIG. 12.

FIG. 13A and FIG. 13B show a simulation result on the relation between the deviation of the DC bias and the power of the monitor signal. Note that FIG. 13A and FIG. 13B shows the simulation result of the I arm and the Q arm, respectively, under the same conditions as the FIG. 10A and FIG. 10B.

The above simulation result shows that, in either of the I arm and the Q arm, the power of the monitor signal becomes maximum when the DC bias of the phase modulators 13 and 14 is appropriately adjusted. Therefore, in such a case, by adjusting the DC bias so as to maximize the power of the monitor signal, the communication quality can be improved. In the configuration shown in FIG. 12 (the configuration in which the DC component of the monitor signal is not removed), there is no large difference between the case of generating the monitor signal from the optical DQPSK signal and the case of generating the monitor signal from the optical RZ-DQPSK signal, as shown in FIG. 13A and FIG. 13B.

Third Embodiment

FIG. 14 is a diagram describing the configuration of the optical DQPSK transmitter apparatus of the third embodiment. The optical DQPSK transmitter apparatus of the third embodiment comprises a function for adjusting the amount of phase shift of the phase shifter 15 of the optical DQPSK modulator 10 in addition to the DC bias control function of the second embodiment.

A control unit 60 provides the DC bias control function and the phase shift amount adjusting function based on the power of the monitor signal obtained by the power detector unit 42. Here, the control unit 60 is realized by a CPU, for example, executing a prepared program. A gain adjuster unit 61 is the same as the minimum power detector unit 51 and the bias adjuster unit 52 shown in FIG. 9.

The amount of phase shift of the phase shifter 15 has to be accurately adjusted at π/2, as stated above. The amount of phase shift of the phase shifter 15, particularly in this embodiment, is adjusted by the DC bias applied to the phase shifter 15.

A DC bias generator unit 62 generates a DC bias signal for adjusting the amount of phase shift of the phase shifter 15 in accordance with the instruction from a bias adjuster unit 66. A pilot signal generator unit 63 generates a pilot signal. The frequency of the pilot signal (hereinafter referred to as f0) is adequately lower than the bit rate of the transmission data, and, for example, it is from a several kHz to a several MHz. The generated pilot signal is superimposed on the DC bias signal and provided to the phase shifter 15. By so doing, the amount of phase shift of the phase shifter 15 changes at the frequency f0. As a result, the optical DQPSK signal, the optical RZ-DQPSK signal, and the monitor signal contain the f0 component and its harmonic component.

A band pass filter 64 extracts the f0 component. In other words, the f0 component is extracted from the power signal representing the power of the monitor signal. A synchronous detection unit 65 performs synchronous detection on the output signal of the band pass filter 64 using the pilot signal generated by the pilot signal generator unit 63. A bias adjuster unit 66 determines the DC bias for adjusting the amount of phase shift to be generated by the bias generator unit 61 in accordance with the result of the synchronous detection.

Figure 15:
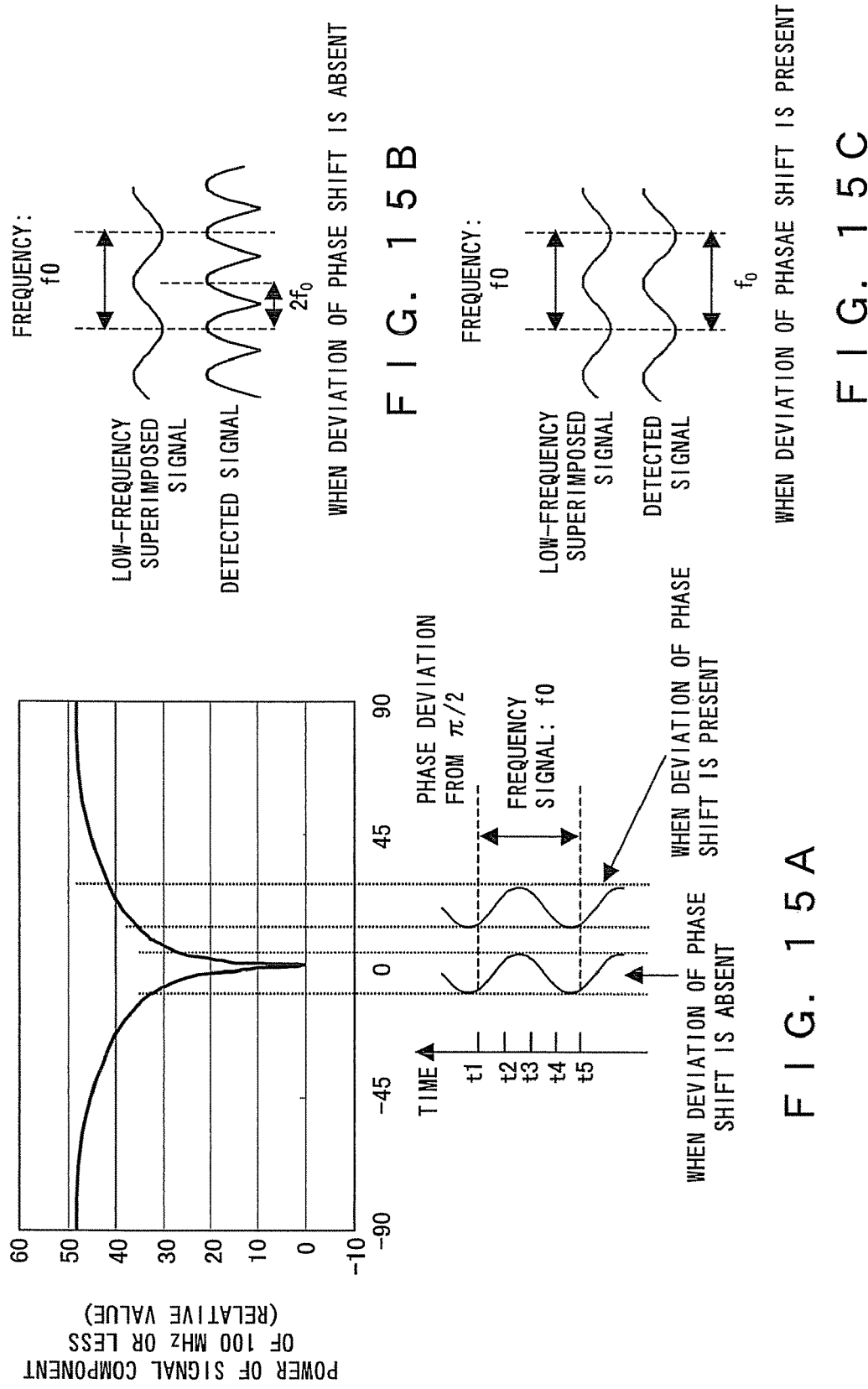
FIG. 15A to FIG. 15C are diagrams explaining the principle of a method for adjusting the amount of phase shift.

A method for adjusting the amount of phase shift of the phase shifter 15 is set forth with reference to FIG. 15A through FIG. 15C. The power detected by the power detector unit 42, as shown in FIG. 15A, depends on the amount of phase shift of the phase shifter 15, and the power is minimum when the amount of phase shift is "π/2".

When the pilot signal is provided to the phase shifter 15, the amount of phase shift of the phase shifter 15 changes (or oscillates) by the frequency f0. At that time, if the amount of phase shift is "π/2" or close to "π/2", the amount of phase shift, when the pilot signal is provided, dithers about the point where the power detected by the power detector unit 42 is minimum. For example, during one cycle period of the pilot signal (time t1-t5), the power detected by the power detector unit 42 changes as the following: Time t1, approximately +30 dB (relative value); time t2, zero (relative value); time t3, approximately +30 dB (relative value); time t4, zero (relative value); and time t5, approximately +30 dB (relative value). In other words, the power detected by the power detector unit 42 oscillates at the frequency 2f0, as shown in FIG. 15B. That is, the output signal of the power detector unit 42 contains the 2f0 component.

Meanwhile, if the amount of phase shift deviates from the "π/2", the amount of phase shift, when the pilot signal is provided, dithers in a region away from the point where the power detected by the power detector unit 42 is minimum. For example, during the time t1-t5, the power detected by the power detector unit 42 changes as the following: time t1, approximately +36 dB (relative value); time t2, approximately +39 dB (relative value); time t3, approximately +42 dB (relative value); time t4, approximately +39 dB (relative value); and time t5, approximately +36 dB (relative value). In this case, the output signal of the power detector unit 42 contains the f0 component as shown in FIG. 15C; however, the 2f0 component is not contained.

As explained above, when the amount of phase shift deviates from "π/2", the f0 component is detected from the output signal of the power detector unit 42; however, the 2f0 component is not detected. When the amount of phase shift is close to "π/2", the 2f0 component is detected from the output signal of the power detector unit 42, while the f0 component is reduced. Therefore, the amount of phase shift can be converged at "π/2" by the feedback control on the phase shifter 15 so that the f0 component detected by the synchronous detection unit 65 becomes minimum.

Figure 16:
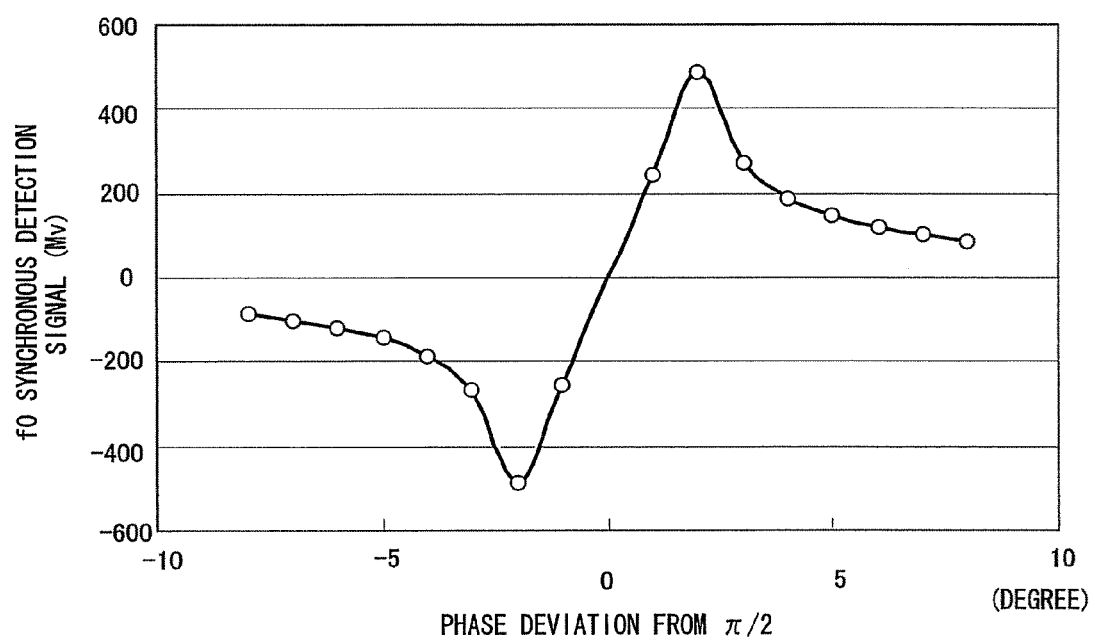
FIG. 16 is a diagram showing the relation between the $f_0$ component and the phase deviation.

In addition, the phase of the f0 component signal output from the power detector unit 42 when the amount of the phase shift deviates in a positive side is inverted from the phase when the amount of the phase shift deviates in a negative side. Therefore, the bias adjuster unit 66 can determine whether the amount of the phase shift by the phase shifter 15 is to be increased or to be decreased (i.e. whether the phase is to be rotated in a positive direction or in a negative direction) based on the phase of the f0 component signal detected by the synchronous detection unit 65. The output signal of the synchronous detection unit 65 is shown in FIG. 16. Note that the method for adjusting the amount of phase shift of the phase shifter by using the pilot signal are described, for example, in U.S. patent application Ser. No. 11/298,892.

As explained above, the optical DQPSK transmitter apparatus of the third embodiment provides a DC bias control function and a phase shift amount adjusting function. The monitor unit for generating the monitor signal (i.e. the photodetector 31, the capacitor C, the amplifier 41 and the power detector unit 42) can be shared for realizing both of the two functions. Consequently, increase in the circuit size can be suppressed. Note that the DC bias control process and the phase shift amount adjusting process may be executed simultaneously in parallel or may be executed separately.

Fourth Embodiment

Figure 17:
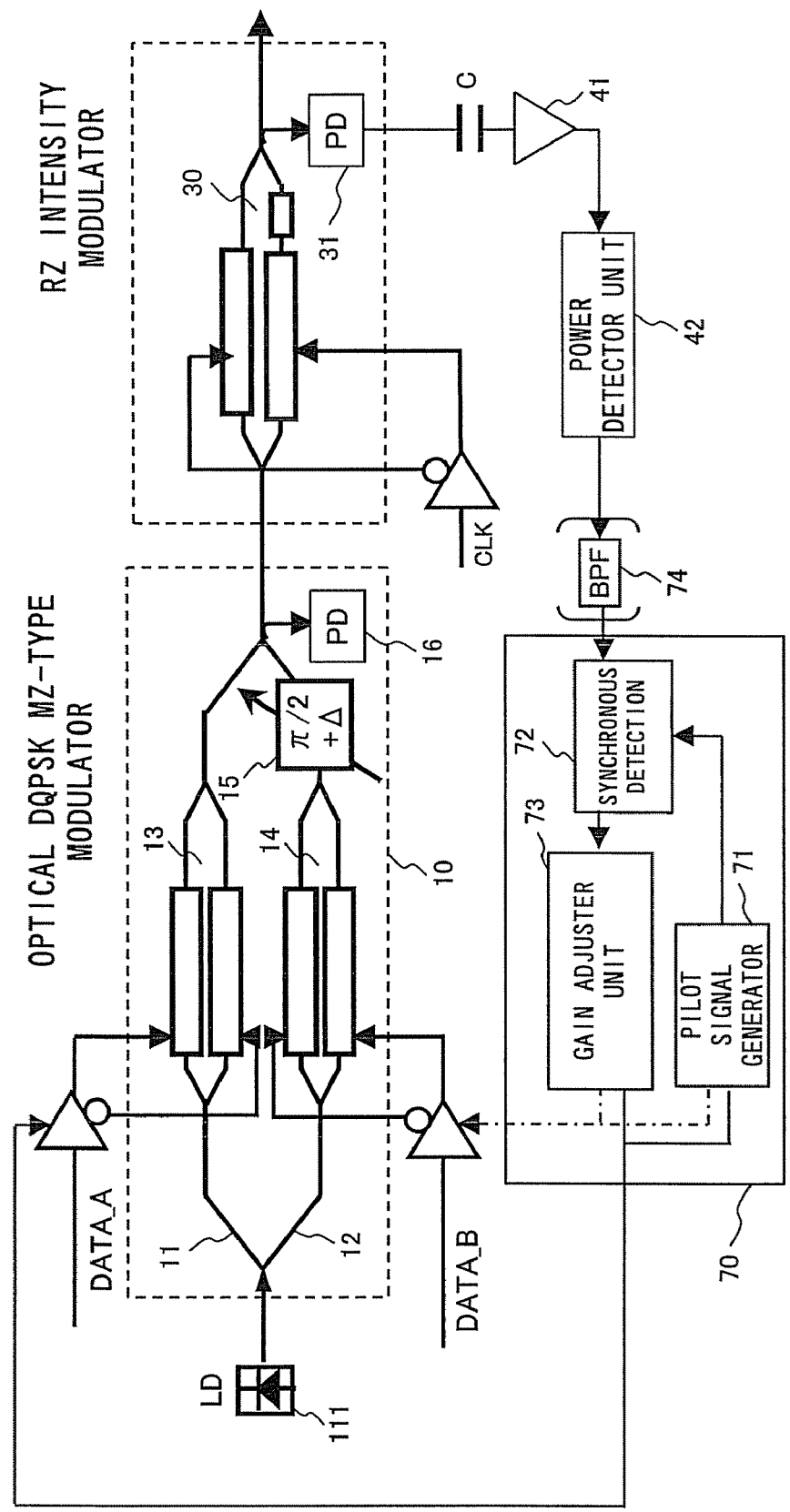
FIG. 17 is a diagram showing the configuration of the optical DQPSK transmitter apparatus of the fourth embodiment.

FIG. 17 is a diagram showing the configuration of the optical DQPSK transmitter apparatus of the fourth embodiment. The optical DQPSK transmitter apparatus of the fourth embodiment comprises a function for adjusting the amplitude of the driving signal by employing the pilot signal.

A control unit 70 adjusts the gains of the amplifiers 21 and 22 based on the monitor signal power value obtained by the power detector unit 42 in order to optimize the amplitude of the driving signal data 1 and data 2. Here, the control unit 70 can be realized by a CPU executing a prepared program, for example.

A pilot signal generator unit 71 generates the pilot signal for adjusting the gains of the amplifiers 21 and 22. The frequency of the pilot signal (hereinafter referred to as f1) is substantially low, compared with the bit rate of the transmission data, and it is several kHz to several MHz, for example. The generated pilot signal is superimposed on each of a pair of gain control signals for controlling the gains of the amplifiers 21 and 22, and is provided to the amplifiers 21 and 22. By so doing, the gain of the amplifiers 21 and 22 changes by the frequency f1, and the amplitude of the driving signal data 1 and data 2 changes by the frequency f1. As a result, the optical DQPSK signal, the optical RZ-DQPSK signal, and the monitor signal contain the f1 component and its harmonic component.

A synchronous detection unit 72 performs synchronous detection on the power signal representing the power of the monitor signal obtained by the power detector unit 42 by using the pilot signal (or a frequency-doubled signal, the frequency of which is increased twice as high as that of the pilot signal) generated by the pilot signal generator unit 71. The gain adjuster unit 73 generates a gain adjusting signal for adjusting the gains of the amplifiers 21 and 22 in accordance with the result of the synchronous detection. A bandpass filter 74 for extracting the f1 component (or 2f1 component) from the power signal representing the power of the monitor signal may be provided in the previous stage of the synchronous detection unit 72.

Figure 18:
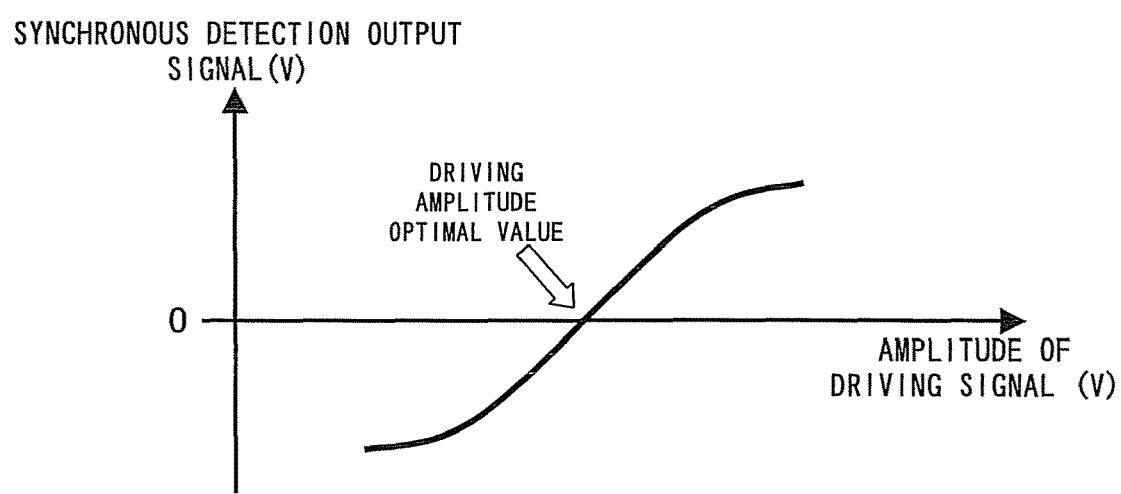
FIG. 18 is a diagram explaining the synchronous detection by the synchronous detection unit.

FIG. 18 is a diagram explaining the synchronous detection by the synchronous detection unit 72. The output of the synchronous detection unit 72 is zero (or approximately zero) when the amplitude of the driving signals data 1 and data 2 is optimized. Thus, the amplitude of the driving signal is optimized by adjusting the gains of the amplifier 21 and 22 so that the output of the synchronous detection unit 72 converges at zero. The polarity (positive or negative) of the output of the synchronous detection unit 72 changes depending on whether the amplitude of the driving signal is larger or smaller than the optimal value. Therefore, whether the gains of the amplifiers 21 and 22 should be increased or should be reduced can be recognized by monitoring the polarity of the output of the synchronous detection unit 72.

Figure 19:
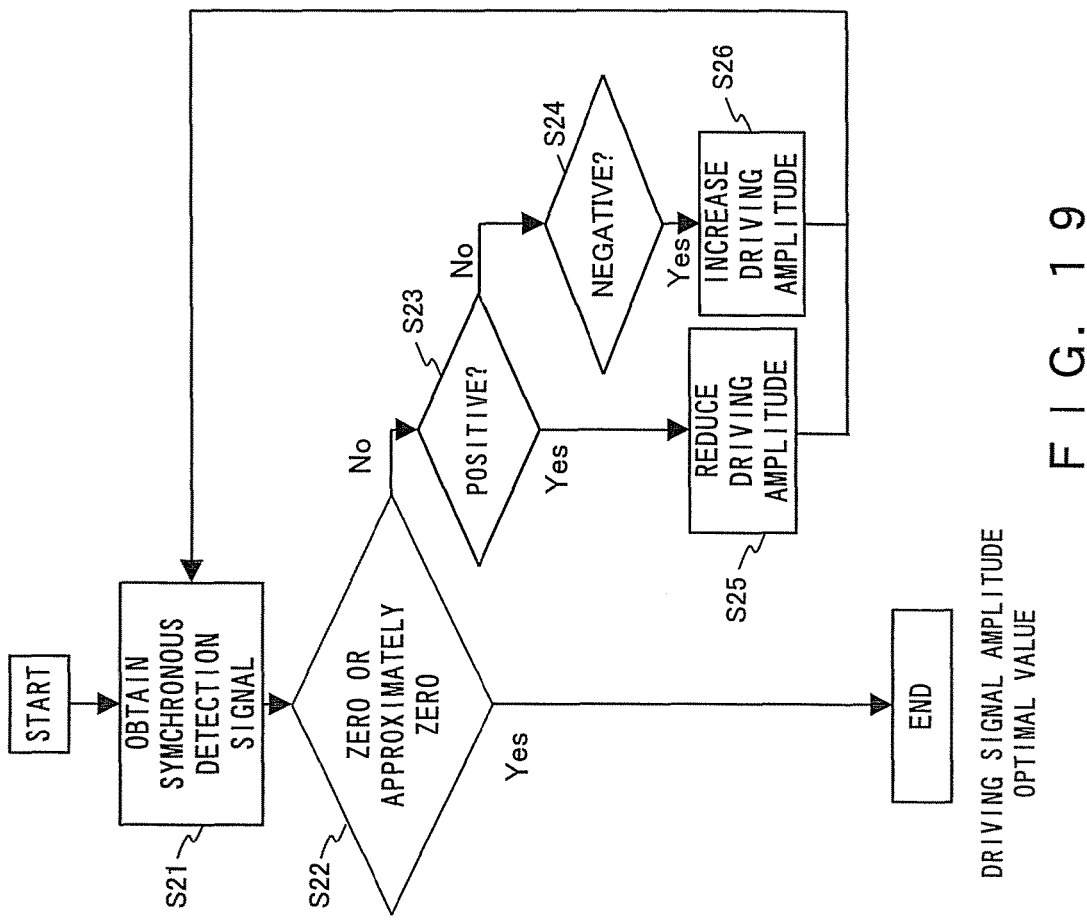
FIG. 19 is a flowchart showing the operations of the control unit of the fourth embodiment.

FIG. 19 is a flowchart showing the operations of the control unit 70. In step S21, the synchronous detection signal output from the synchronous detection unit 72 is obtained. In step S22, whether or not the synchronous detection signal is zero (or approximately zero) is checked. Here, the "approximately zero" indicates that the signal is smaller than the expected noise etc. If the synchronous detection signal is zero (or approximately zero), it is determined that the amplitude of the driving signal is adjusted to the optimal value, and the process is terminated.

In steps S23 and S24, the polarity of the synchronous detection signal is checked. When the polarity of the synchronous detection signal is positive, it is determined that the amplitude of the driving signal is too large, and an instruction to reduce the gain of the amplifier 21 (or 22) by a prescribed amount in step S25. On the other hand, when the polarity of the synchronous detection signal is negative, it is determined that the amplitude of the driving signal is too small, and the instruction to increase the gain of the amplifier 21 (or 22) by a prescribed amount in step S26. The processes in steps S23 to S26 are repeated until the synchronous detection signal converges at zero (or approximately zero).

The processes of the flowchart are performed at initialization of the optical DQPSK transmitter apparatus, and the processes may be additionally performed during the optical DQPSK transmitter apparatus is in operation, if needed.

Fifth Embodiment

Figure 20:
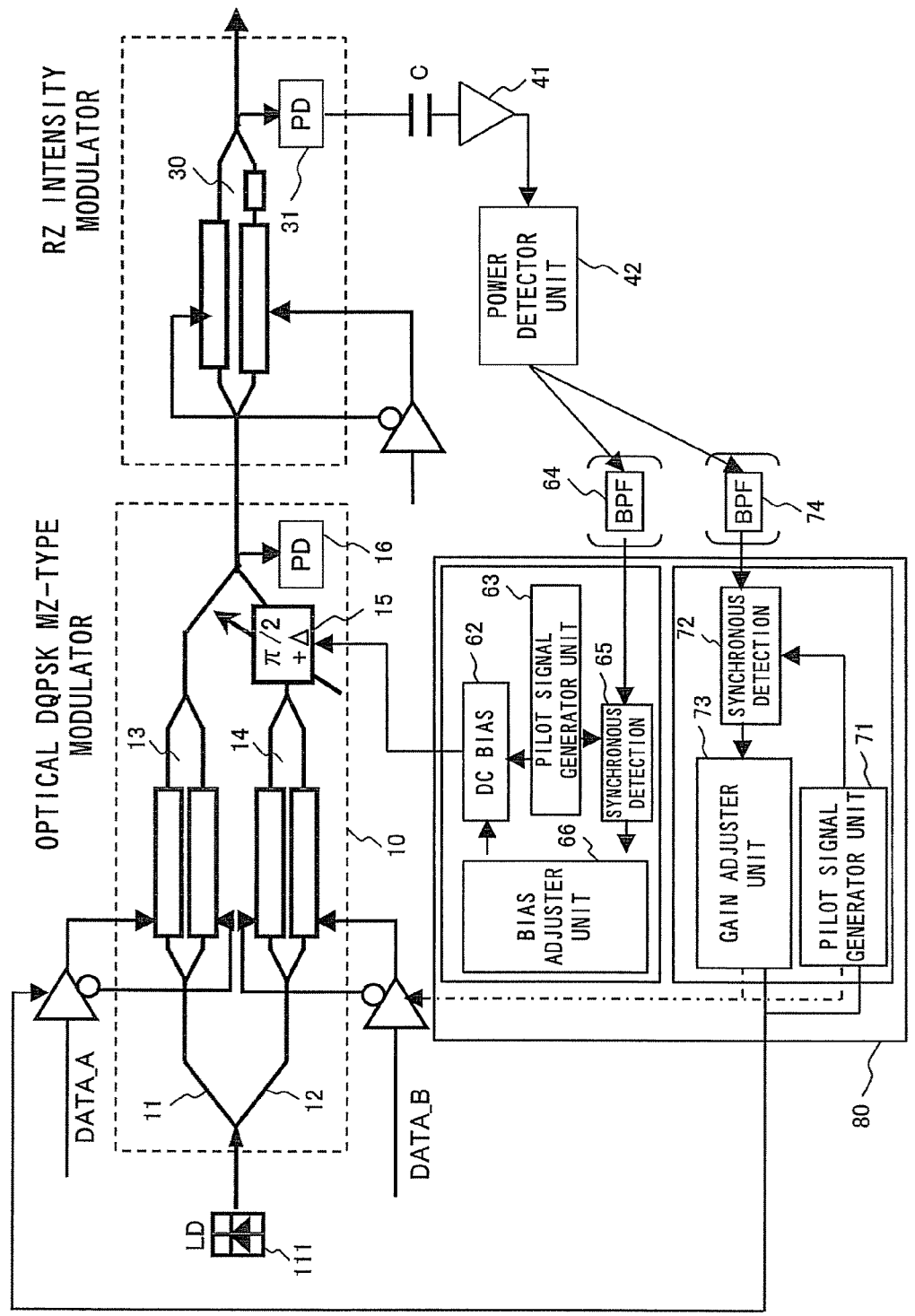
FIG. 20 is a diagram describing the configuration of the optical DQPSK transmitter apparatus of the fifth embodiment.

FIG. 20 is a diagram describing the configuration of the optical DQPSK transmitter apparatus of the fifth embodiment. The optical DQPSK transmitter apparatus of the fifth embodiment comprises a function for adjusting the amount of phase shift of the phase shifter 15 in addition to the amplitude adjusting function of the forth embodiment.

A control unit 80 comprises the DC bias generator unit 62, the pilot signal generator unit 63, the synchronous detection unit 65, and the bias adjuster unit 66, which are explained with reference to FIG. 14, further comprises the pilot signal generator unit 71, the synchronous detection unit 72, and the gain adjuster unit 73, which are explained with reference to FIG. 18, and provides the amplitude adjusting function and the phase shift amount adjusting function. Note that the explanation of the operations of the control unit 80 is omitted in this section since the same operations are explained in the third and the fourth embodiments.

It is preferable that the frequency of the pilot signal for adjusting the amplitude generated by the pilot signal generator unit 71 and that of the pilot signal for adjusting the amount of phase shift generated by the pilot signal generator unit 63 differ from each other. Particularly, in the case that the amplitude adjusting process and the phase shift amount adjusting process is performed in parallel, those frequencies have to be different from each other.

<Variation>

The adjusting processes of the first through the fifth embodiments are performed at initialization of the optical DQPSK transmitter apparatus, and the processes may be additionally performed during the optical DQPSK transmitter apparatus is in operation, if needed. When performing the adjusting processes during the optical DQPSK transmitter apparatus is in operation, the processes may be periodically performed, or may be continually performed.

The first, the forth and the fifth embodiments describes the configurations for optimizing the amplitude of the driving signal by adjusting the gain of the amplifier for amplifying the driving signal; however, the present invention is not limited to such configurations. In other words, it is possible that a variable attenuator for adjusting the amplitude of the driving signal is provided instead of the amplifiers 21 and 22 and the amount of attenuation of the variable attenuator is adjusted by according to the monitor signal.

In the above embodiments, the DQPSK modulation is explained in main; however, the control of the present invention is applicable to the QPSK modulation. The present invention is also applicable to the 2nPSK (n≧3) or QAM. However, in applying the present invention to these modulations, multiple-value data should be used as a data signal input to a data modulator unit, for example.

When an LN (LiNbO3) modulator is employed as a modulator, it is preferable to use a polarization maintaining optical fiber for the connection between the optical source and the optical DQPSK modulator, and between the optical DQPSK modulator and the RZ intensity modulator, since the LN modulator has a polarization dependency.

What is claimed is:

1. An optical transmitter apparatus, comprising:
a phase modulator, having a first phase modulation element for generating a first modulation signal on a first arm in accordance with a first driving signal, a second phase modulation element for generating a second modulation signal on a second arm in accordance with a second driving signal, and a phase shift element for providing a phase difference between the first arm and the second arm, which generates a phase-modulated signal by combining the first and second modulation signals;
a DC bias generator unit for generating first DC bias and second DC bias for adjusting an operation point of the first and second phase modulation elements;
an intensity modulator for performing intensity modulation on the phase-modulated signal output from said phase modulator;
a detection unit for detecting the power of an AC component of an optical signal output from said intensity modulator; and
an adjuster unit for adjusting an amount of phase shift of the phase shift element as well as adjusting at least one of the first bias or the second bias based on the power detected by said detection unit.

* * * * *